United States Patent Office 2,855,789
Patented Oct. 14, 1958

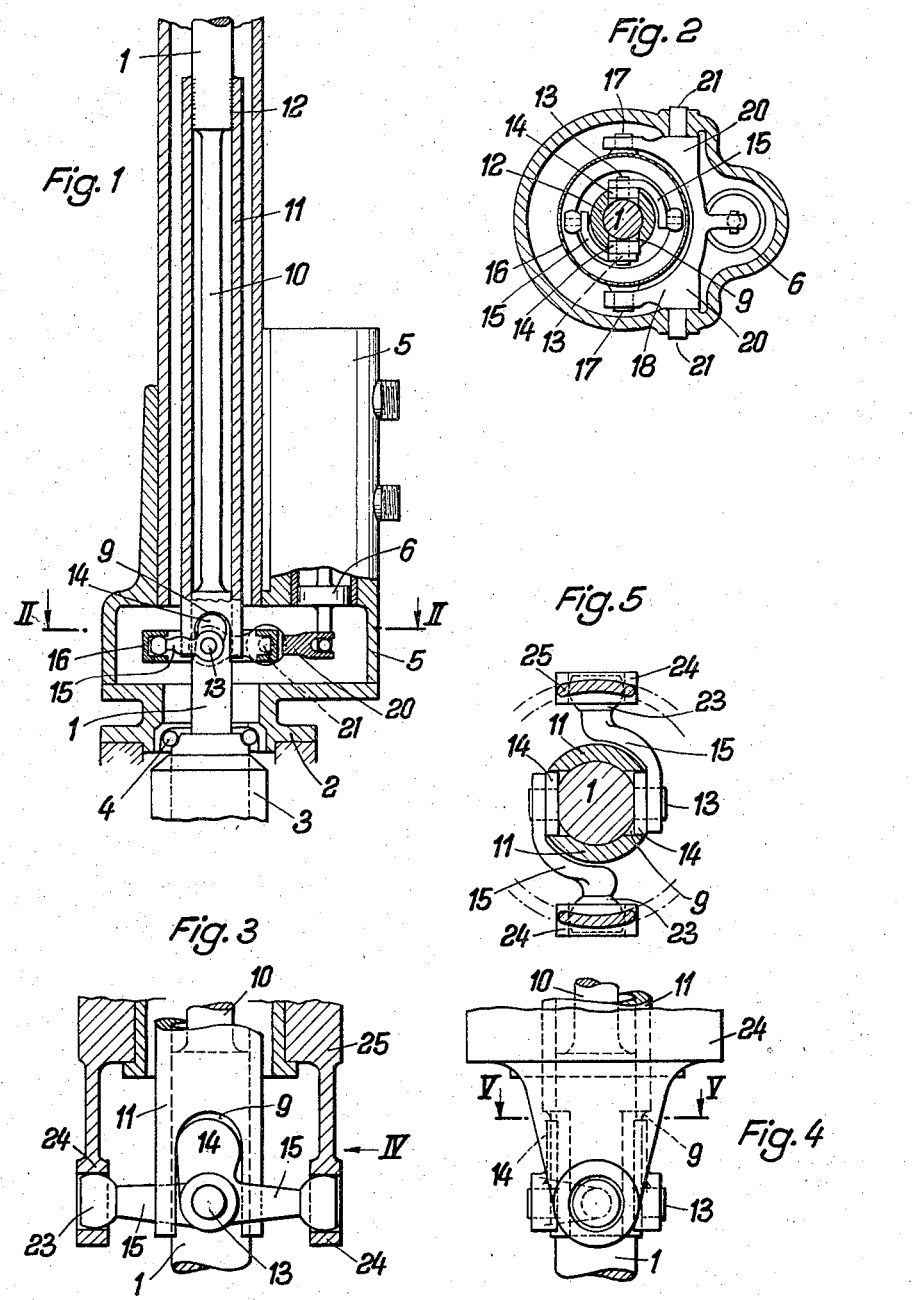

2,855,789

STEERING ARRANGEMENT FOR MOTOR VEHICLES WITH APPLICATION OF AN AUXILIARY POWER DEVICE

Hubert F. von Thüngen, Friedrichshafen am Bodensee, Germany, assignor to Zahnradfabrik Friedrichshafen, Friedrichshafen am Bodensee, Germany Application April 5, 1954, Serial No. 421,107

Claims priority, application Germany April 4, 1953

5 Claims. (Cl. 74—388)

The invention relates to the improvement of the steering of the auxiliary power steering device of motor vehicles.

In some steering arrangements known so far there was used for the control of the auxiliary power the movement of members which are arranged after the actual steering drive (worm with engagement member). The steering took place either with the aid of the movement of the finger lever shaft or the axial movement of the steering worm. This has the disadvantage that for the control of the auxiliary power a relatively large steering angle is necessary which is felt as a dead drive. There has become known also an auxiliary steering arrangement in which there is maintained a sufficiently large steering path for the steering of the servo power even in the case of smaller deflections of the steering wheel. For this purpose there is built in between the steering spindle and the steering worm an additional transfer arrangement, namely a gear transmission whereby the reaction pressure which arises in the transmission effects the control of the servo power. This arrangement is fairly inconvenient constructually.

With the invention there is now provided an advantageous simplification in that the twisting force which arises in the steering wheel column is used directly for the control of the auxiliary steering power, and namely, in that a rotation elastic part is provided in the steering column. This rotation elastic part can be either a rotation elastic catch coupling or a part of the steering is formed as rotation rod spring. Hereby there is provided at one end of the rotation rod spring a rotation rigid sleeve the other free end of which executes the relative movement. This relative rotation movement is transformed through guide arrangements such as guide levers or through ball pairs which are guided in inclined slots into a straight line movement for actuating a steering slide which is to be displaced lengthwise. This control motion is preferably directed in the same line as the steering column axis. The steering slide can be arranged either parallel next to the steering column or coaxially around the steering column.

According to the invention it is found that the servo power is used only to the extent that the twisting force on the steering column requires it so that with a small twisting force here is still a steering without servo power and that a reversing force can still have an effect on the steering wheel in a noticeable manner.

The drawing shows embodiments of the invention.

Fig. 1 shows a steering column with a rotation rod spring arranged therein and with means for transmitting the twisting movement to a servo steering slide which is directed parallel sideways of the steering column. The individual parts, namely the slide housing with the steering slots and the slide, are shown in longitudinal section.

Fig. 2 shows a section along line II—II of Fig. 1.

Fig. 3 shows an embodiment of the steering arrangement with a servo steering slide arranged on the same axis as the steering column. A steering slide and the valve parts are shown in longitudinal section.

Fig. 4 is a side view to Fig. 3, shown in the direction of the arrow IV (Fig. 3).

Fig. 5 shows a cross section along V—V of Fig. 4.

The steering column 1 is mounted in the usual manner in housing 2 of the steering worm 3, for instance by means of a supporting ball bearing 4. Above the steering worm is a housing 5 for a slide member 6 with reciprocates to control a valve mechanism (not shown) of conventional construction. Steering column 1 shows on a part of its length a weaker cross section and forms thus a rotation rod spring 10. Above this rotation rod spring, namely at point 12 sleeve 11, is fixedly connected with the steering column. With its lower end this sleeve is loosely rotatably guided on the steering column and is connected by simple guide members with the steering slide 6 in such a way that the twisting movement between the steering column 1 and sleeve 11 causes axial movements of the slide 6. On steering column 1 there are arranged two opposite rotation points 13. Each projection 13 carries an angle lever with a rounded arm 14 directed upwardly and an arm 15 extending horizontally. Each of the arms 14 projects into one of the slots 9 provided in sleeve 11 while horizontal levers 15 each project with a ball shaped head or a roller in a guide ring 16. The guide ring 16 rests with point 17 in the fork ends 18 of a double arm lever 20 and can be tilted around points 21, that is around a horizontal axis. Lever 20 is itself also tiltable around the horizontal axis and that is so because of its mounting by means of point 21 in the housing 5 which is standing still. Arm 22 of lever 20 which stands opposite to the fork ends 18 connect in an articulated manner on the steering slide 6. From Figs. 1 and 2 can be seen that any small left or right rotations of the steering column upper part create in respect to its lower part carrying the steering worm corresponding upward and downward movements of the steering slide 6 and that thus the auxiliary power for the steering is brought into or put out of action.

In the example of Figs. 3 to 5 the steering column 1 forms according to Fig. 1 a rotation rod spring 10 and the sleeve 11 is provided in the same manner. Into slots 9 of this sleeve reach the upwardly directed arms 14 of two angle levers the horizontal arms 15 of which reach with ball shaped ends 23 into eyes 24 of the cylindrical steering slide 25. Both angle levers are mounted rotatably on the rotation points 13 provided on the steering column. With the rotation of sleeve 11 there takes place over the angle levers 14, 15 a corresponding longitudinal movement of slide 25.

I claim:

1. A steering mechanism having a manually rotative control shaft comprising a resilient element having torsional strain motion relative the shaft axis when said shaft is subjected to manual rotation under predetermined steering load, and control means carried by said element for effecting control of a source of auxiliary power when torsional strain occurs in said shaft, said resilient element comprising an elongated necked-down torsion stressed portion of said shaft integral therewith, including a sleeve secured to said shaft and rotative therewith, and being relatively rotative with respect to the load end of said necked-down portion, said control means comprising bell crank lever means pivotally carried by said shaft, said bell crank lever means being engageable by said sleeve and driven thereby to actuate said control means upon relative rotation between said sleeve and said load end of said shaft when said shaft is rotated under steering load so as to effect torsional stress therein.

2. A device as set forth in claim 1, wherein said sleeve extends for the length of said elongated necked-down portion and houses said portion, said sleeve being fastened to said shaft at a point opposite the load end of said necked-down portion and being rotative relative said shaft beyond said load end portion, including a notch in said sleeve, said bell crank lever carried by said shaft at the load end thereof, and having a portion extending into said notch whereby relative rotation at the load end of said shaft between said shaft and said sleeve effects rocking of said bell crank lever to actuate auxiliary power control means.

3. A device as set forth in claim 1, wherein rotation of said shaft under no load effects simultaneous rotation of said sleeve, there being no relative rotation between said sleeve and shaft under said no load condition, said control means comprising an element engageable by a portion of said bell crank lever at any angular position of said shaft occurring in the course of steering.

4. A device as set forth in claim 3, wherein said last-mentioned element comprises a ring surrounding said sleeve and said shaft adjacent the load end thereof, said bell crank lever portion being movably rotated by said ring so as to rotate with respect thereto about the axis of said shaft, said ring being pivotally mounted so as to be rocked when there is relative rotation between said sleeve and the load end of said shaft, by virtue of motion thus provided to said bell crank lever, for controlling a source of auxiliary power.

5. A device as set forth in claim 1, including a collar, means for relatively and reciprocally mounting said collar concentrically about said sleeve, a portion of said bell crank lever engaging said collar, wherein said bell crank lever and said sleeve and collar are rotative about the axis of said shaft when said shaft is rotated under no-load condition, said bell crank lever serving to shift said collar longitudinally for controlling an auxiliary power source when there is relative rotation between said shaft and said inner sleeve under load condition.

References Cited in the file of this patent

UNITED STATES PATENTS

| | | |
|---|---|---|
| 2,682,778 | Creson et al. | July 6, 1954 |
| 2,685,211 | Haynes et al. | Aug. 3, 1954 |
| 2,688,258 | Haynes et al. | Sept. 7, 1954 |